US008555065B2

(12) United States Patent  
Cesnik

(10) Patent No.: US 8,555,065 B2  
(45) Date of Patent: Oct. 8, 2013

(54) METHOD AND APPARATUS FOR TRANSMITTING, RECEIVING AND DECODING DATA USING ENCODED PATTERNS OF CHANGING COLORS

(76) Inventor: Jeffrey Thomas Cesnik, Winchester, VA (US)

( * ) Notice: Subject to any disclaimer, the term of this patent is extended or adjusted under 35 U.S.C. 154(b) by 91 days.

(21) Appl. No.: 13/216,433

(22) Filed: Aug. 24, 2011

(65) Prior Publication Data

US 2013/0051553 A1 Feb. 28, 2013

(51) Int. Cl.
*H04L 9/00* (2006.01)

(52) U.S. Cl.
USPC ............................................. 713/168; 713/170

(58) Field of Classification Search
USPC .......... 380/200; 713/168–170, 176, 182, 186; 726/26–28; 382/100, 115–118, 124
See application file for complete search history.

(56) References Cited

U.S. PATENT DOCUMENTS

| | | | |
|---|---|---|---|
| 2,635,140 A | | 4/1953 | Dome |
| 5,361,261 A | | 11/1994 | Edem et al. |
| 5,636,292 A | * | 6/1997 | Rhoads ............................ 382/232 |
| 6,590,996 B1 | * | 7/2003 | Reed et al. ...................... 382/100 |
| 6,722,567 B2 | | 4/2004 | Shaked et al. |
| 7,020,327 B2 | | 3/2006 | Tack-don et al. |
| 7,093,298 B2 | | 8/2006 | Rodriquez et al. |
| 7,370,200 B2 | | 5/2008 | Kindberg et al. |
| 7,698,556 B2 | | 4/2010 | Zhang et al. |
| 7,738,711 B2 | | 6/2010 | Kondo et al. |
| 7,840,028 B2 | | 11/2010 | Simske |
| 2003/0035580 A1 | | 2/2003 | Wang et al. |
| 2003/0065918 A1 | | 4/2003 | Willey |
| 2003/0066890 A1 | | 4/2003 | Shaked et al. |
| 2003/0112471 A1 | | 6/2003 | Damera-Venkata et al. |
| 2004/0200904 A1 | | 10/2004 | Pinson |
| 2007/0297612 A1 | | 12/2007 | Feder et al. |
| 2008/0309259 A1 | | 12/2008 | Snijder et al. |
| 2009/0256922 A1 | | 10/2009 | Gersten et al. |

OTHER PUBLICATIONS

"Sensing color with the TAOS TCS230", TAOS, May 17, 2005.
TCS3404, TCS3414 Digital Color Sensors, Product Catalog, Apr. 2011.
"Trends in CMOS Image Sensor Technology and Design", by Abbas El Gamal, Department of Electrical Engineering; Stanford University, last updated Jul. 9, 2003.
TCS3414 EVM User's Guide TAOS, Texas Advanced Optoelectronic Solutions, Rev 1.0, date unknown.
TAOS, Texas Advanced Optoelectronic Solutions, TCS3404, TCS3414 Digital Color Sensors, TAOS137A, Apr. 2011.
RSA Authentication Agent Software, Protecting the virtual enterprise at every level, RSA Security Inc., (c) 2002-2008.
RSA SecurID Authenticators, The gold standard in two-factor authentication, EMC Corporation, (c) 2011.
RSA Authentication Manager, Enterprise-class security engine for RSA SecurID authentication, EMC Corporation (c) 2000-2010.

* cited by examiner

*Primary Examiner* — Hosuk Song
(74) *Attorney, Agent, or Firm* — James W. Pravel; Intellalegal

(57) ABSTRACT

A system and method for encoding, transmitting and decoding data is described which defines a plurality of bit patterns into a predetermined color combination of red/green/blue colors. A message is formed from the plurality of bit patterns and the message is then arranged into a recognizable format with a message protocol. The message is transmitted to a decoder, which decodes the message and displays the message on a display. A use is provided to establish a two factor authentication mechanism to authenticate a user by a requester.

15 Claims, 10 Drawing Sheets

| | R: 255<br>G: 0<br>B: 0<br>Encoding:<br>Ob011 | | |
|---|---|---|---|
| | R: 0<br>G: 255<br>B: 255<br>Encoding:<br>Ob010 | | |
| | R: 0<br>G: 255<br>B: 0<br>Encoding:<br>Ob001 | | R: 0<br>G: 0<br>B: 255<br>Encoding:<br>Ob111 |
| | R: 0<br>G: 0<br>B: 0<br>($c_b$,Encoding:<br>Ob000) | | R: 255<br>G: 128<br>B: 0<br>Encoding:<br>Ob110 |
| | R: 128<br>G: 128<br>B: 128<br>($c_r$, reserved for<br>protocol) | | R: 255<br>G: 255<br>B: 0<br>Encoding:<br>Ob101 |
| | R: 255<br>G: 255<br>B: 255<br>($c_w$, reserved for<br>protocol) | | R: 255<br>G: 0<br>B: 255<br>Encoding:<br>Ob100 |

Authenticate - Step 2

Username: Jane Doe — 34a (Flashing Colors) — 40

Password: ********

Challenge: ABC123

[Submit]

Authenticate - Step 1

Username: [____] — 34

[Next]

— 33

METHOD AND APPARATUS FOR TRANSMITTING, RECEIVING AND DECODING DATA USING ENCODED PATTERNS OF CHANGING COLORS

FIELD OF THE INVENTION

The present invention relates generally to a method of transmitting, receiving and decoding data using a stream of patterns of changing colors. Specifically, the data is used together with a two factor authentication system and method.

BACKGROUND OF THE INVENTION

In the 1920's, a series of experiments were conducted on human sight which led to the specification of what is called the CIE xyz color space. This color space contains all perceivable colors (or gamut) that the human eye can detect. Most computer monitors, televisions and other similar devices use an RGB (red/green/blue) color space model, which is a subset of the CIE xyz color space due to the fact that these devices cannot recreate every possible human perceptible color. By combining different values of three primary colors (red, green, and blue), any color within the RGB color space gamut can be created. Not to be overlooked, white is the combination of all three primary colors and black is the absence of any color.

Most electronic displays in use today represent color with 8 bits of precision; that is, the intensity of each color channel (red, green, or blue) can be represented as an 8-bit number (0-255 decimal, or 0x00-0xFF hex). A modern electronic display is capable of producing on the order of 16.7 million distinct colors using this method.

In order to transmit data through a display device, the sequential presentation of colors representing encoded data must be presented as a video stream, or alternatively, presented via dedicated software to mimic a video stream—at a frame rate that can be reproduced reliably on a given display device. The refresh rate of a given display device will dictate the highest achievable video frame rate, with 60 Hz being a common baseline on desktop computer displays. 15-30 frames per second video can be reliably displayed on such devices, meaning that raw data transfer rates on the order of a few tens to a few hundred bits per second could be achieved assuming a data encoding density of 3 to 8 bits per distinct color. By increasing either or both data encoding density and number of frames displayed per second, the data transfer rate can be increased accordingly.

Many different electronic sensors are capable of detecting colors, and most work off of the same principle—a photosensitive device behind one or more color filters. For example, an imaging sensor that you would find in a digital camera consists of thousands (or millions) of pixels, with each individual pixel being behind a red, green, or blue color filter. By counting the number of photons hitting the sensor over a given period of time (integration), a relative digital count of each red, green and blue pixel can be ascertained—the combination of which would yield a digital representation of the sensed color.

Other than common multi-pixel imaging sensors, there also exists a class of device which is basically a dedicated "single-pixel" color sensor; that is, a sensor that is only able to detect a single color at a time. An example of such a sensor is the TCS3414 digital color sensor manufactured by Texas Advanced Optoelectronic Solutions (TAOS). Similar sensors are also manufactured by Avago Technologies as well as others. These are generally available in very small packages (approximately 2 mm×2 mm square) and at very low price points (a few dollars each). These sensors are used in industry for a number of purposes including industrial process control, instrumentation (colorimeters), consumer toys, etc.

Most electronic sensors described above do not respond equally to a given primary (red, green or blue) color; that is, the blue channel in such sensors is generally less sensitive than the red and green channels, while the green channel is less sensitive than the red channel. This unequal channel response, together with potential inconsistent repeatability and overall sensitivity characteristics can create challenges if such single pixel sensors were to be used to sense and decode a stream of encoded "video" data. What is needed is a novel method considering such challenges inherent in the single pixel sensor that will allow the sensor to operate at relatively high frequencies of 15-30 frames per second or more to decode a single-color "video stream", and effectively to become a single-pixel video camera.

SUMMARY OF THE INVENTION

A method for transmitting encoded data is provided which comprises the steps of:
  defining a plurality of bit patterns, each bit pattern corresponds to a predetermined color combination of red, green and blue channels;
  forming a message from the plurality of bit patterns;
  arranging the message into a recognizable format with a message protocol;
  transmitting the message to a decoder;
  decoding the message by the decoder; and
  displaying the message on a display.

The method for transmitting encoded data is incorporated into a two factor authentication method comprising the steps of:
  a. Entering a user name to a requester by a user wishing to be authenticated;
  b. Looking up a cryptographic key by requester, the key corresponding to a user's implementing device;
  c. encoding a challenge phrase or set of characters as changing colors that only the user's device can successfully decode;
  d. presenting the encoded challenge to the user as a sequence of flashing colors on a display screen;
  e. holding the implementing device up to the display screen by the user;
  f. decoding the challenge by the implementing device;
  g. decrypting the challenge by the implementing device;
  h. submitting the password and successfully decoded and decrypted challenge by the user to the requester;
  i. determining whether or not the challenge corresponds to the encoded challenge by the requester and therefore whether or not the identity and validity of the user corresponds to a stored record.

The method for transmitting encoded data may also be incorporated into other methods such as for interactive consumer toys, advertising incentives (interactive coupons) and in-field firmware or software updates.

A two factor authentication system is provided which comprises a transmitter configured to display a plurality of bit patterns in a predetermined color combination of red, green and blue channels; an implementing device having a microprocessor and a display; said microprocessor configured to decode and decrypt said plurality of bit patterns displayed by said transmitter into a challenge; whereby said challenge is displayed on said display of said implementing device, to provide a security system that allows a user to respond to said transmitter with a decoded and decrypted challenge to pass a two factor authentication test.

Applicant has successfully tested the system and method and the results are both surprising and unexpected. Because of the relatively low sensitivity of existing sensors to red, green, blue channels, it is surprising that the inventive system and method are able to successfully encode and decode the video data.

BRIEF DESCRIPTION OF THE DRAWINGS

FIG. 3 is an example palette of colors to be used to encode data with a bit density of d=3 bits, with their corresponding RGB tuple values and an example binary mapping;

Figure 5:
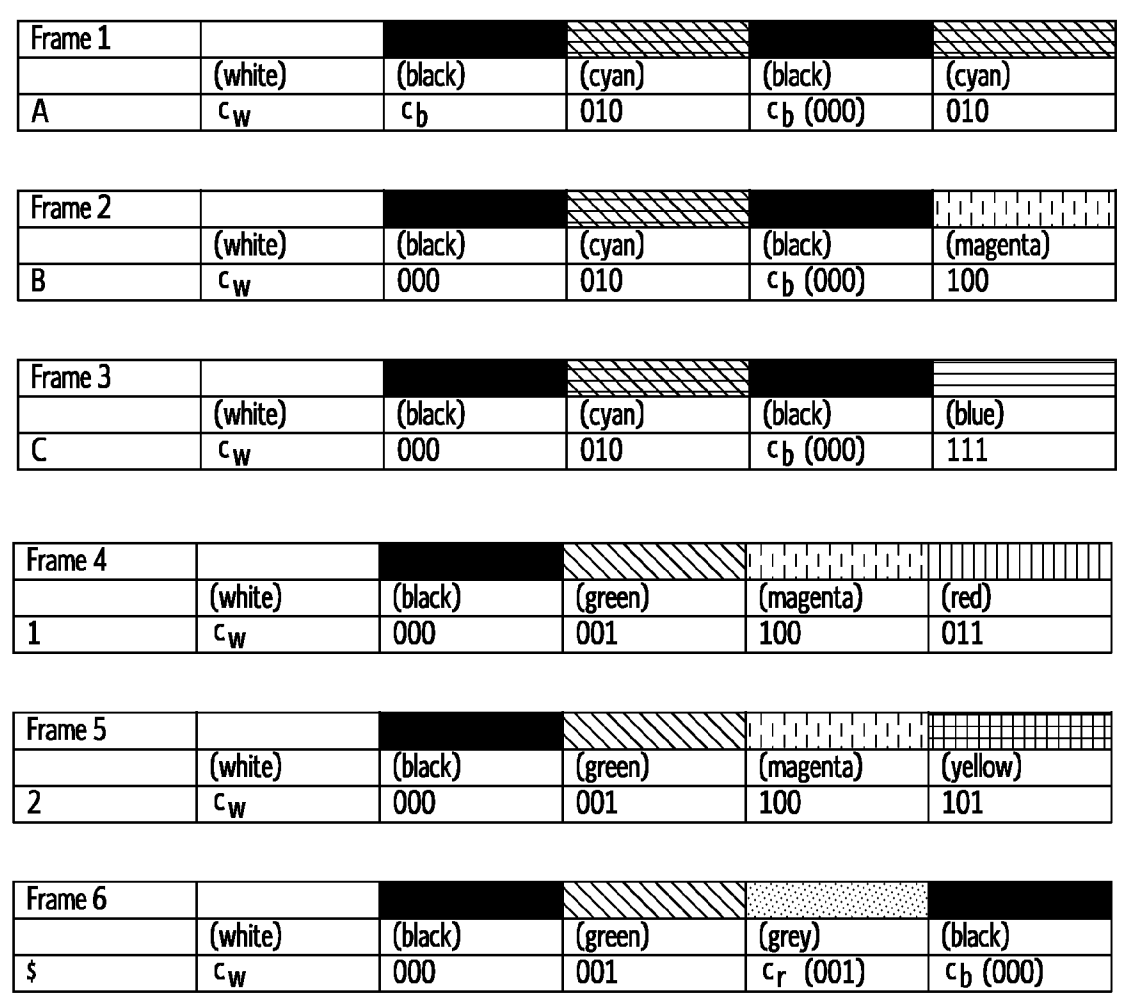

FIG. 5 is an example of an encoded message, with colors shaded according to convention;

FIG. 6 is a front view of a video monitor showing Step 1 of authentication;

FIG. 7 is a front view of a video monitor showing Step 2 of authentication;

DETAILED DESCRIPTION OF A PREFERRED EMBODIMENT

Figure 1:
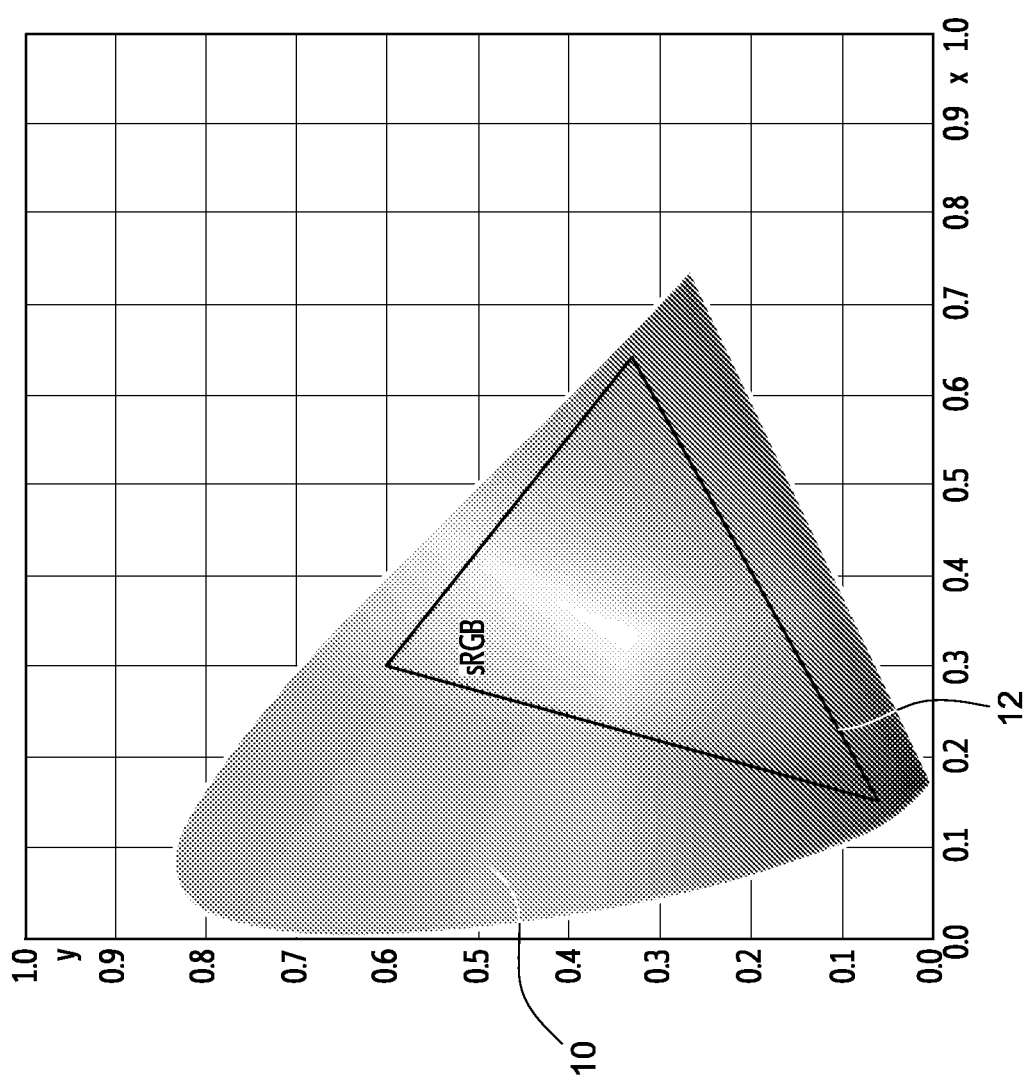
FIG. 1 is the CIE xy chromaticity diagram, showing the human perceptible color region and the colors that can be represented in video and in desktop computing (RGB color space)

In FIG. 1 a CIE xy chromaticity diagram is shown. The "horseshoe" 10 encloses all human perceptible colors while the triangle 12 encloses colors that can be represented in video and in desktop computing (RGB color space). The implementing device and method transmit and receive data in the form of color selected from within the triangle 12 enclosed area of the CIE xy chromaticity diagram.

Figure 2:
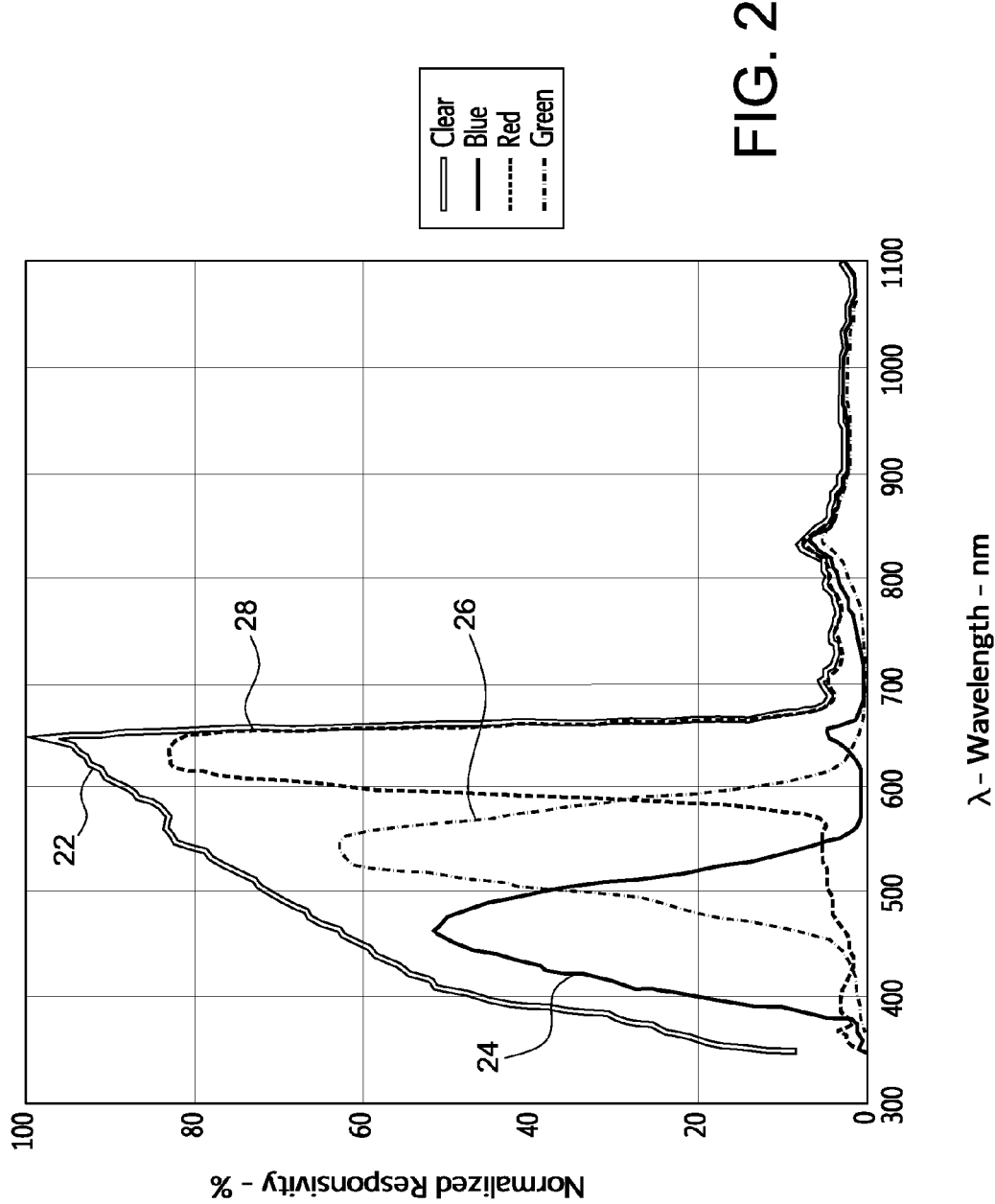
FIG. 2 is an example digital color sensor graph of normalized sensitivity, demonstrating the un-equal response of the individual color channels.

Most electronic color sensors do not respond equally to a given primary color (i.e. red, green, blue). In FIG. 2 an example digital color sensor graph of normalized sensitivity, demonstrating the unequal response of the individual color channels. The blue channel shown in the graph as line 24 is generally less sensitive than the green channel 26 or the red channel 28, while the green channel 26 is less sensitive than the red channel 28.

The binary bit pattern is defined by assigning a given color (combination of red, green and blue channels). The number of distinct colors able to be reliably and repeatedly detected dictates the bit density of the encoding. While an electronic display device may be capable of generating 16.7 million distinct colors, the probability of accurate detection of that many distinct values is significantly reduced based not only on sensor sensitivity, but also environmental conditions such as detection distance, ambient lighting, brightness of the display source, presence of any interference, noise sources, etc.

As an example, consider a goal of being able to detect reliably 10 distinct colors (including white and black) with a given sensor, taking into account sensor channel sensitivity variations across all environmental and ambient lighting conditions. This would yield a data encoding density of 3 bits using 8 of the available colors, with 2 colors reserved for protocol overhead. These extra colors are necessary for calibration and protocol data synchronization as described below.

Based on this bit density, an 8-bit number could be represented as the sequential presentation of 3 colors (the extra encoded bit could be used as a parity check bit within a given protocol implementation or for other purposes). Consider that if one were able to reliably detect 66 distinct colors, this would yield a data encoding density of 6 bits—thereby increasing the data transfer rate accordingly.

Encoding and Decoding Algorithm

The following encoding and decoding algorithms are used to perform the inventive method.

Definitions:

Let M be an n-bit message that we want to transmit and receive, defined by a bit sequence $M=(b_1, b_2, \ldots, b_n)$.

Let C be the set of k colors reserved for data encoding, defined as $C=(c_1, c_2, \ldots, c_k)$, with each $c_i$ defined as an RGB tuple $(r_i, g_i, b_i)$ and where k is a power of two.

Let $c_b$ be the color BLACK, which may appear in C.

Let $c_w$ be the reserved color WHITE, not appearing in C.

Let $c_r$ be the optional reserved color indicating a sequence of two repeating colors, also not appearing in C.

Let $d=\log_2(k)$, the number of data bits represented per color.

Let r be the number of data encoding colors per frame, where a frame is an (r+2) block of sequential colors transmitted in group succession (the "payload").

Let f: $[0, k-1] \rightarrow C$ be a function defined by $f(i)=c_{i+1}$. This mapping is used to encode any d-bit value as a color.

Let $f^{-1}$: $C \rightarrow [0, k-1]$ be a function defined by $f^{-1}(c_i)=i-1$. This mapping is the inverse of f and is used to decode colors to d-bit values.

Let j=n/d, this will be the length of the color sequence to encode M.

Encoding Algorithm Steps

1. Pad M so its length is the next multiple of (d*r). This ensures that M's encoding ends on an exact frame boundary.
2. Divide M into j sequential and distinct d-bit subsequences $(M_1, M_2, \ldots, M_j)$ such that $M=M_1M_2 \ldots M_j$.
3. Encode the subsequences using f into a color sequence $E=(e_1, e_2, \ldots, e_j)$ where $e_i=f(M_i)$.
4. Starting at $M_1$, insert the subsequence $(c_w, c_b)$ every r-th color in E. The subsequence $(c_w, c_b)$ serves as a frame delimiter within the protocol as well as max/min calibration values used for value normalization and color detection.
5. Optionally, replace each repeating pair of colors $(e_i, e_{i+1})$ where $e_i=e_{i+1}$ with $(e_i, c_r)$. This optional step ensures that repeating colors are encoded with a color transition which is more likely to be detected and decoded properly.

FIG. 3 illustrates an example of encoding 10 colors, including white ($c_w$) and black ($c_b$). The bit density for the example in FIG. 3 is 3 bits/color, which results in 10 colors. In practice, the inventor has achieved a bit density >=6 bits/color, which results in the reliable detection of at least 66 available colors.

Figure 4:
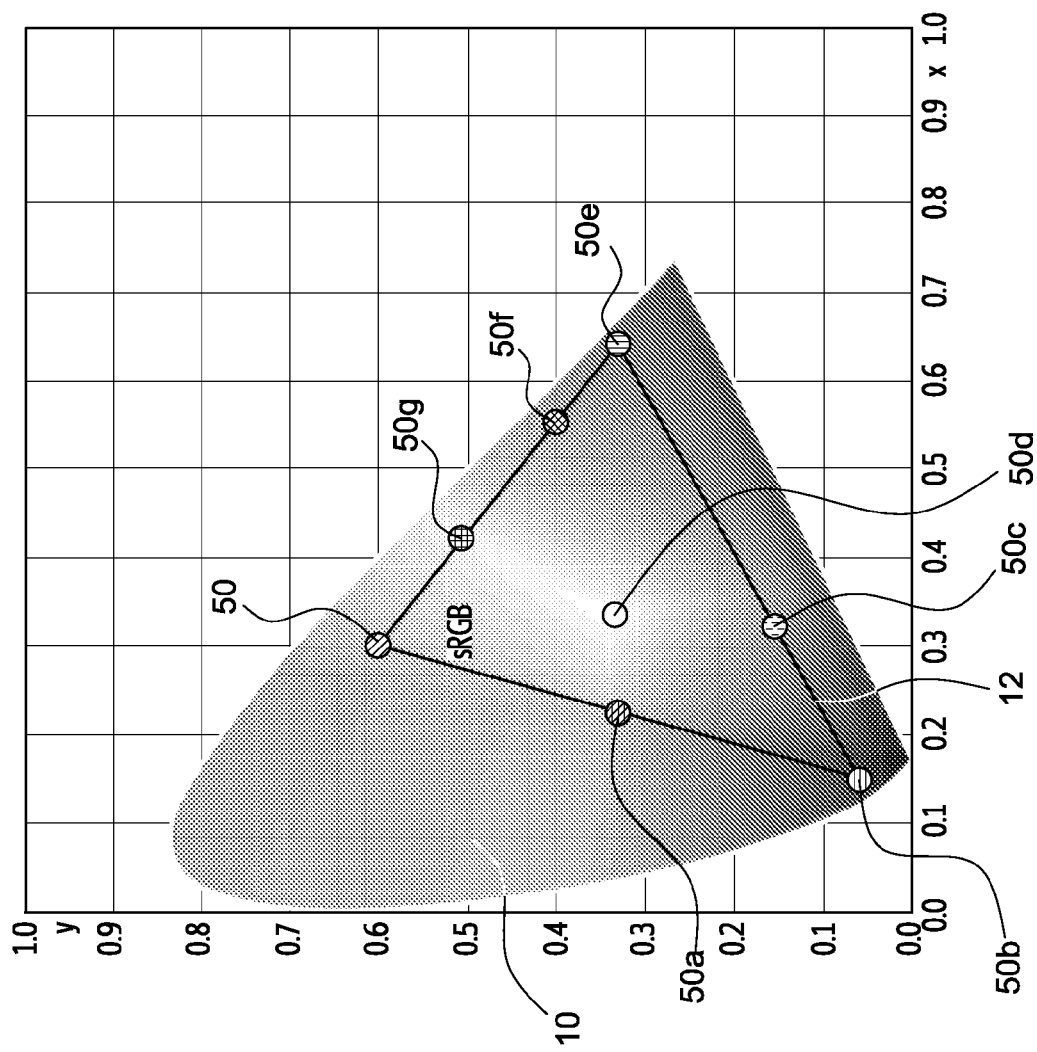
FIG. 4 is the example palette from FIG. 3 plotted against the CIE chromaticity diagram, illustrating their even distribution within the sRGB color space (cb {black} and cr {grey} not shown)

FIG. 4 shows the example palette from FIG. 3 plotted against the CIE chromacity diagram. The plot in FIG. 4 illustrates that the colors used for encoding 50,50a,50b,50c,50d, 50e,50f,50g are not closely spaced, are distinct, and are generally completely contained within the sRGB color space 12. As anyone skilled in the colorimetry art would understand, $C_b$ (black) and $C_r$ (grey) are not clearly depicted, as they both represent different intensities of white and both $C_b$ (black) and $C_r$ (grey) map to the same 2D point within the diagram shown in FIG. 4.

Example Encoded Message:

For purposes of illustration, the following hypothetical message will be encoded: "A B C 1 2 $"

Using the binary encoding illustrated in FIG. 3, d=3 bits per color. We define r=3 data encoding colors per frame, yielding 9 encoded bits per frame—enough to encode a single 8-bit character with a single bit left over, in this example used as an even parity bit. Note that we are using ASCII characters here; however any arbitrary binary data could just as well be encoded and framed using these methods. Also note that the '$' character was specifically chosen to illustrate the optional use of the $c_r$ reserved color to indicate a repeating binary sequence (the binary sequence 001 appears twice in this character encoding).

Note that the choice of d=3 bits and r=3 were chosen for simplicity and convenience; in practice any reasonable values of d and r could be used. The inventor has achieved reliable transmission and decoding with values of d>=6 bits.

Decoding Algorithm Steps:

Decoding is somewhat more complicated than the encoding algorithm steps due to the differences in color sensor devices, display devices, varying ambient lighting conditions and noise sources. Note that we use the terms "maxima" and "minima" below with respect to the magnitude of the RGB tuples when treated as 3-vectors.

1. Assume we have received a filtered stream of n numeric samples $S=((r_1, g_1, b_1), (r_2, g_2, b_2), \ldots, (r_n, g_n, b_n))$, with each $(r_i, g_i, b_i)$ corresponding to the transmitted color $e_i$ in the color sequence E. Note that while each $(r_i, g_i, b_i)$ corresponds to the $e_i$ transmitted, the actual numerical values will be very different as they are un-normalized and will include a noise component. This precludes us from directly mapping samples in S to their correspondents in E.
2. Divide S into subsequences, or frames, $(S_1, S_2, \ldots, S_n)$ bounded by local maxima (corresponding to $c_w$, which will naturally be the highest occurring values) and of length equal to the number of colors per frame (r), plus the framing delimiters ($c_w$, $c_b$). Recall that $c_w$ is only used as a frame delimiter, never as part of a message encoding; therefore there should never be an issue with identifying false frame boundaries. Conversely, since $c_b$ is a valid color for data encoding, it may appear as one or more colors within the rest of the sequence. This is perfectly acceptable since all we require is that $c_b$ appear at least once in each frame, hence the ($c_w$, $c_b$) sequence denoting a frame delimiter and guaranteeing one occurrence of each.
3. Within each frame $S_i$, use the local maxima's and minima's r, g, b values corresponding to the transmitted ($c_w$, $c_b$) values to calibrate and transform all values within $S_i$, yielding the original transmitted sequence E. The exact details of this transformation is color sensor device-dependent and implementation-specific.
4. Optionally, restore duplicate symbols by replacing each $e_i = c_r$ in E with its predecessor $e_{i-1}$.
5. Restore the original $M_i$ subsequences of M by applying $f^{-1}$ to each element of E:

$$(f^{-1}(e_1), f^{-1}(e_2) \ldots, f^{-1}(e_j)) = (f^{-1}(f(M_1)), f^{-1}(f(M_2)), \ldots, f^{-1}(f(M_1))) = (M_1, M_2, \ldots, M_j)$$

6. Finally, concatenate each $M_i$ to obtain M: $M = M_1 M_2 \ldots M_j$.

While the above example protocol would work well for transmitting a continuous stream of character data, a packet-based protocol could be easily implemented by layering additional protocol building block elements on top of the example described above to identify, for example, message start, message length, etc. Additionally, a cyclic redundancy check element, or even a forward error correcting code could be added to a message packet to ensure (with reasonable certainty) that the message packet was received without error and decoded properly. Note that the use of the parity check bit encoding described in the example above is arbitrary—the extra bit could just as well have been used for data encoding.

Two Factor Authentication System and Method:

Refer now to FIGS. 6-11, which illustrate the inventive two factor authentication system and method. Traditionally, two factor authentication schemes have relied on the principles of something you have, and something you know. In practice, a user wishing to authenticate with a given web site or software package is presented with a standard username/password login screen where their username is entered along with their password (something you know). A changing number appearing on a small handheld device is appended to their password—this number is cryptographically unique, and identifies that the user actually has the implementing device on their person (something you have).

Figure 8:
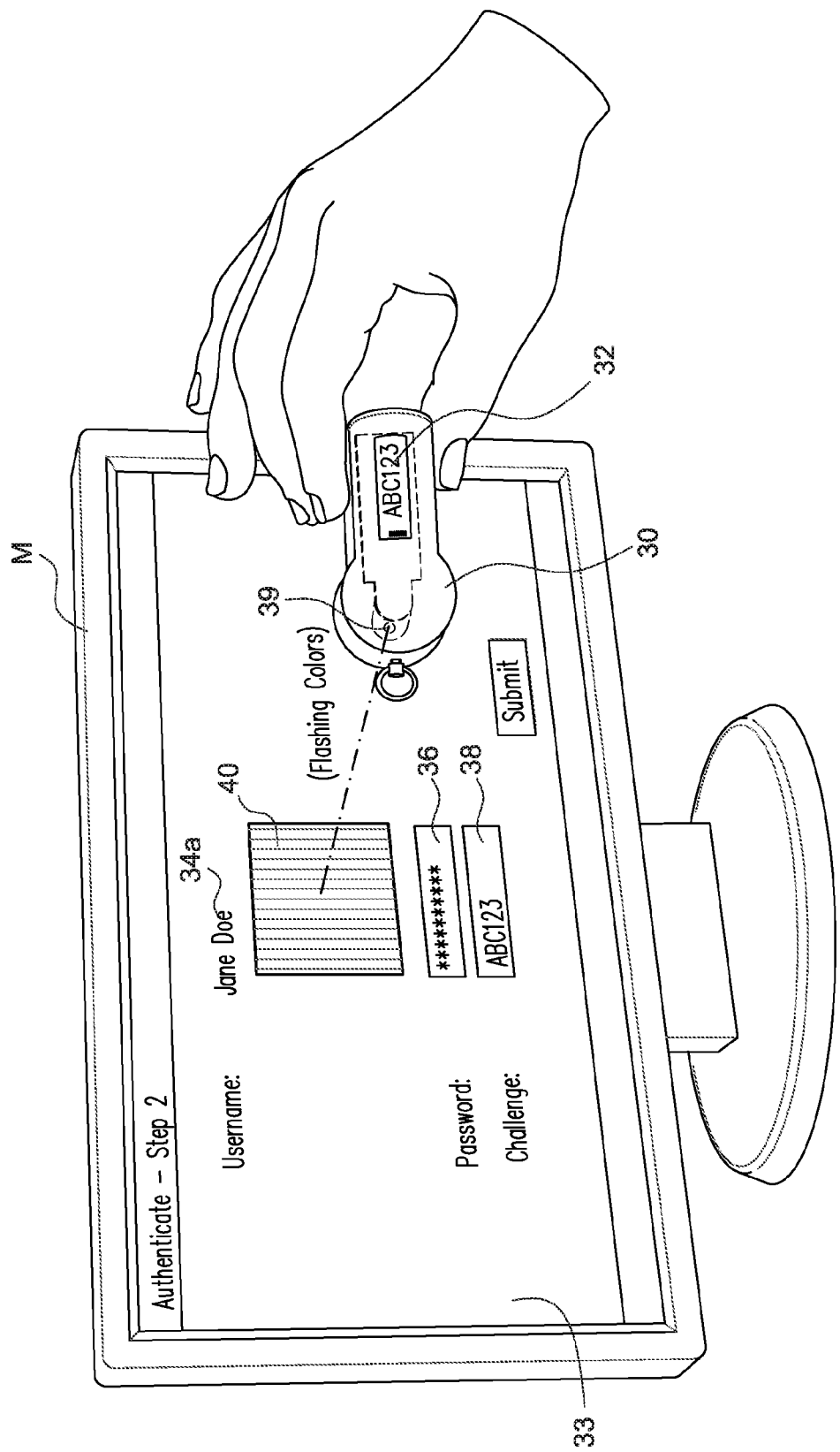
FIG. 8 is an isometric view of a user holding an example implementing device (a two-factor authentication token) in front of a video monitor.
Figure 9:
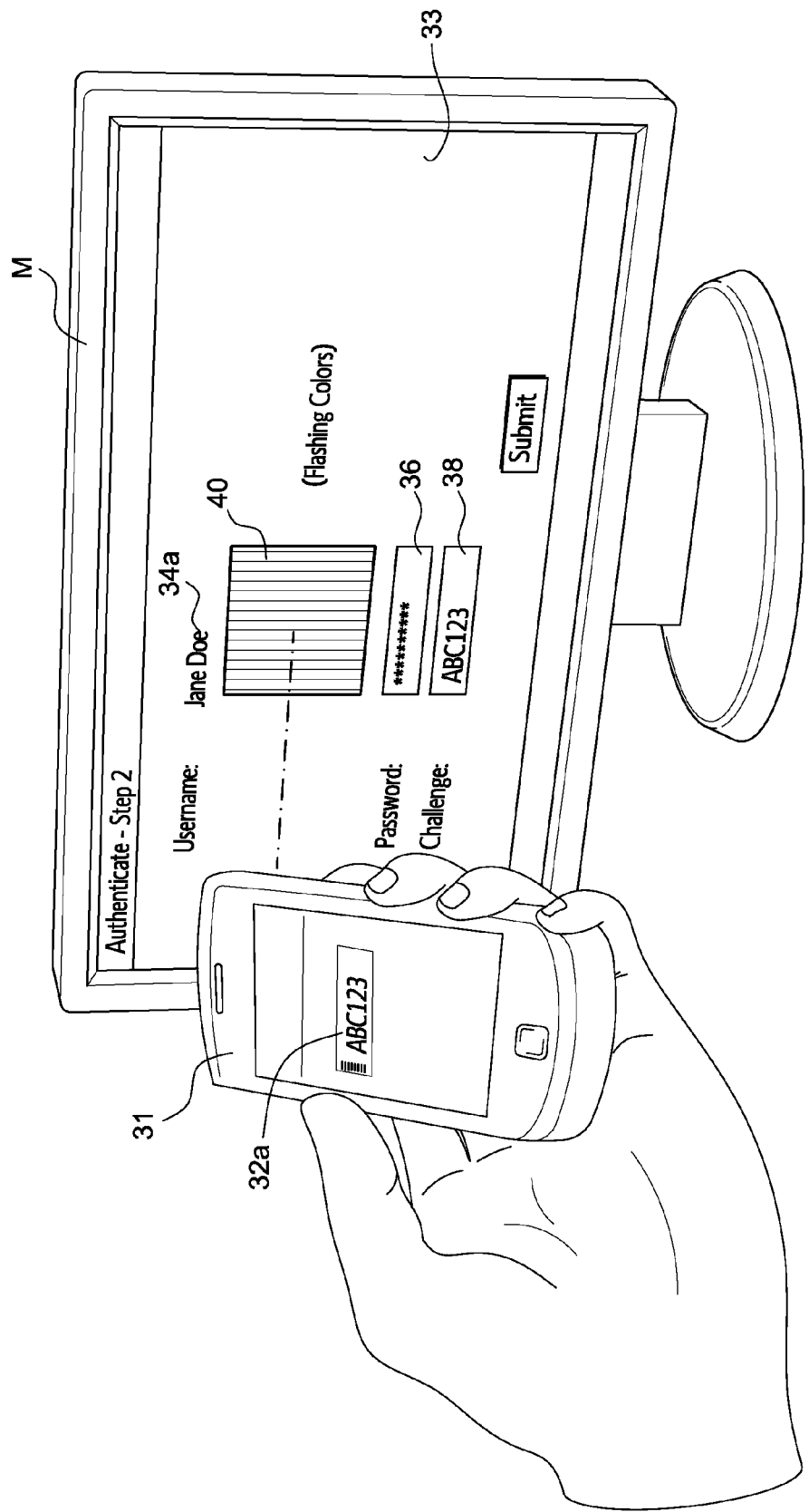
FIG. 9 is an isometric view of a user holding a smart phone device in front of a video monitor.
Figure 10:
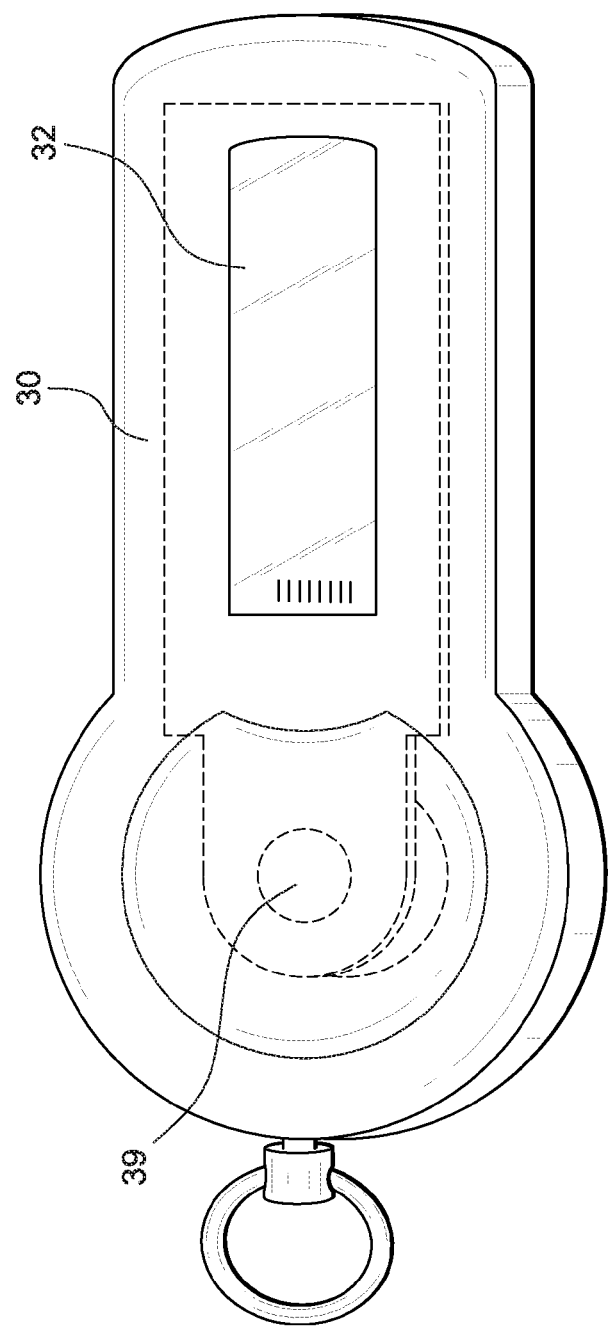
FIG. 10 is an isometric view of an example implementing device (a two-factor authentication token)
Figure 11:
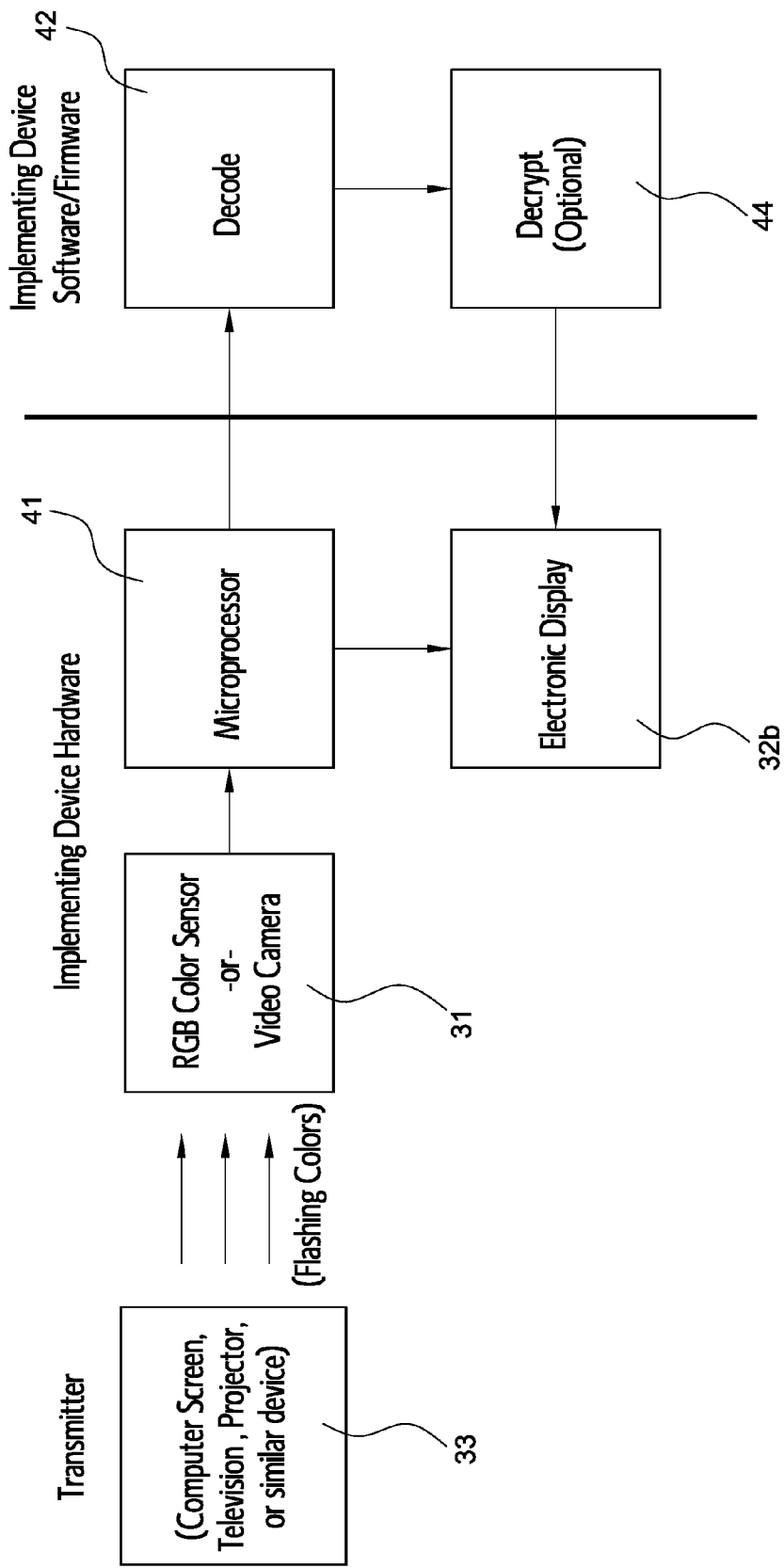
FIG. 11 is block diagram showing the interconnections of an implementing device.

The implementing device can be in the form of a small dedicated hardware token implementing a single-pixel RGB color sensor (for example, the TAOS TCS3414 or similar device, shown in FIGS. 8 and 10 as item 39), with the implementing device shown in FIGS. 8 and 10 as item 30, together with a small 6-12 character electronic display device element 32 in FIGS. 8 and 10. The implementing device can alternatively be implemented as software running on a smart device such as a cell phone with video capability (as shown in FIG. 9) or similar. In FIG. 11, block 31 is described as an RGB color sensor or video camera, which may be implemented in the user's device 30 (FIGS. 8 and 10) or 31 (FIG. 9).

Referring still to FIGS. 6-11, the following steps would fulfill this use case:

1. A user wishing to authenticate enters and submits their username in the username field 34 to the requesting software or web site.
2. The software "looks up" a unique cryptographic key corresponding to the user's device 30 (FIGS. 8 and 10) or 31 (FIG. 9), and generates a challenge phrase (or set of characters) to be presented to the user.
3. The challenge phrase or set of characters is encrypted using the cryptographic key identified in step 2, which only the users' device (30 or 31) should be able to successfully decrypt.
4. The encrypted challenge phrase is encoded via the encoding algorithm steps described above.
5. The encrypted and encoded challenge phrase is presented to the user through a computer screen 33 or similar device ("transmitter") as a sequence of flashing colors (40).
6. The user holds the implementing device (30 or 31) up to the transmitter in order to receive the transmitted message.
7. An RGB color sensor or video camera within the implementing device (30 or 31), connected to a microprocessor 41, is sampled periodically by software running on the microprocessor 41.

8. The samples are collected by the microprocessor 41, filtered and processed via the decoding algorithm steps (shown as element 42 in FIG. 11) described above, yielding the originally transmitted but encrypted message.
9. The message is decrypted 44 using the implementing device's unique cryptographic key.
10. If decoding/decryption are successful, the challenge phrase is displayed to the user on the implementing device's electronic display (32 or 32a). If unsuccessful, a message indicating so (or optionally some other sequence of characters, or nothing at all) is displayed to the user on the implementing device's electronic display (32 or 32a).
11. Assuming decoding/decryption success, the user enters their password in the password field 36, and also enters the decoded/decrypted challenge phrase displayed on the implementing device in the challenge field 38.
12. The software or web site makes a determination that the challenge phrase matches what was originally generated and encrypted/encoded, and therefore determines whether or not the identity of the user is valid.

The inventor envisions additional uses for the data encoding and decoding algorithms. For example, the algorithms may be used with interactive consumer toys. Assume that a "command message" is to be transmitted to affect a response from a toy via a child's favorite video, television program, computer game, etc. Considering that the use of encryption could be considered optional, the message would be encoded and transmitted as per steps 4 and 5 above (the "command message" would replace the concept of a human-readable challenge phrase described therein). The toy would implement steps 6 through 9 as a receiver (again with encryption considered optional) to decode the transmitted command message. Upon successful decoding the toy would perform some action based on the command message, to then elicit joy and happiness from the participating children.

The algorithms may also be used with advertising incentives (interactive coupons). Assume that a product manufacturer or an advertiser wishes to provide purchase incentives and to track market response for a given consumer product television commercial campaign. For each geographic area in which the campaign is to be aired, a unique human-readable "coupon code" (replacing the concept of a challenge phrase described above) is encoded into the television commercial (via steps 4 and 5 above, again with the use of encryption considered optional). Consumers within that geographic area would then be able to decode the human-readable "coupon code" via steps 6 through 10 described above, and use it to generate a coupon (via computer) to receive a purchase rebate. Depending upon the specific coupon code entered (and also any optional demographic information entered at the time of coupon generation), the advertiser would be able to identify the market response based on the collected data.

The algorithms may also be used with in-field firmware and software updates. Assume that a device needs to have its firmware or software updated in the field. The binary firmware or software is encoded and transmitted via steps 4 and 5 above (the binary firmware or software would replace the concept of a human-readable challenge phrase described therein). The device implements a receiver as per steps 6 through 9 described above to receive, decode and subsequently update the firmware or software running on the device.

Additional variations from the embodiments may also make use of the data encoding and decoding algorithms which do not depart from the spirit and scope of the claims which follow.

What is claimed is:

1. A method of encoding, transmitting and decoding data by a processor comprising the steps of:
    a. defining a plurality of bit patterns, each said bit pattern corresponding to a predetermined color combination of red, green and blue channels;
    b. encoding a message from said plurality of bit patterns;
    c. arranging said message into a recognizable format with a message protocol;
    d. transmitting said message as a sequence of flashing colors to a decoder;
    e. decoding said message by said decoder; and
    f. displaying said message on a display.

2. A method of encoding, transmitting and decoding data by a processor according to claim 1 wherein said encoding step comprises the steps of defining a set of variables including:
    a. letting M represent said message to be transmitted and received, defined by an n-bit sequence $M=(b_1, b_2, \ldots, b_n)$;
    b. letting C be a set of k colors reserved for data encoding, defined as $C=(c_1, c_2, \ldots, c_k)$, with each $c_i$ defined as an RGB tuple $(r_i, g_i, b_i)$ and where k is a power of two;
    c. letting $c_b$ be a color BLACK, which may appear in C;
    d. letting $c_w$ be a reserved color WHITE, not appearing in C;
    e. letting $c_r$ be an optional reserved color indicating a sequence of two repeating colors, also not appearing in C;
    f. letting $d=\log_2(k)$ be the number of data bits represented per color;
    g. letting r be the number of data encoding colors per frame, where a frame is an (r+2) block of sequential colors transmitted in group succession;
    h. letting f: $[0, k-1] \rightarrow C$ be a function defined by $f(i)=c_{i+1}$, to be used to encode any d-bit value as a color;
    i. letting f-1: $C \rightarrow [0, k-1]$ be a function defined by $f-1(c_i)=i-1$, which is the inverse of f and is used to decode colors to d-bit values;
    j. letting j=n/d, which will be the length of the color sequence to encode M;
    k. performing the encoding steps of:
    l. padding M so its length is the next multiple of (d*r) to ensure that M's encoding ends on an exact frame boundary;
    m. dividing M into j sequential and distinct d-bit subsequences $(M_1, M_2, \ldots, M_j)$ such that $M=M_1M_2 \ldots M_j$;
    n. encoding the subsequences using f into a color sequence $E=(e_1, e_2, \ldots, e_j)$ where $e_i=f(M_i)$; and
    o. inserting the subsequence $(c_w, c_b)$ every r-th color in E, starting at $M_1$; whereby the subsequence $(c_w, c_b)$ serves as a frame delimiter within the protocol as well as max/min calibration values used for value normalization and color detection.

3. A method of encoding, transmitting and decoding data by a processor according to claim 2 wherein an optional step after step n. includes replacing each repeating pair of colors $(e_i, e_{i+1})$ where $e_i=e_{i+1}$ with $(e_i, c_r)$ whereby repeating colors are encoded with a color transition which is more likely to be detected and decoded properly.

4. A method of encoding, transmitting and decoding data by a processor according to claim 1 wherein said decoding step comprises the steps of defining a set of variables including:
   a. letting M represent said message to be transmitted and received, defined by an n-bit sequence $M=(b_1, b_2, \ldots, b_n)$;
   b. letting C be a set of k colors reserved for data encoding, defined as $C=(c_1, c_2, \ldots, c_k)$, with each $c_i$ defined as an RGB tuple $(r_i, g_i, b_i)$ and where k is a power of two;
   c. letting $c_b$ be a color BLACK, which may appear in C;
   d. letting $c_w$ be a reserved color WHITE, not appearing in C;
   e. letting $c_r$ be an optional reserved color indicating a sequence of two repeating colors, also not appearing in C;
   f. letting $d=\log_2(k)$, the number of data bits represented per color;
   g. letting r be the number of data encoding colors per frame, where a frame is an (r+2) block of sequential colors transmitted in group succession;
   h. letting f: $[0, k-1] \rightarrow C$ be a function defined by $f(i)=c_{i+1}$, to used to encode any d-bit value as a color;
   i. letting $f^{-1}: C \rightarrow [0, k-1]$ be a function defined by $f^{-1}(c_i)=i$, which is the inverse of f and is used to decode colors to d-bit values;
   j. letting $j=n/d$, which will be the length of the color sequence to encode M;
   k. performing the decoding steps of:
   l. dividing S into subsequences, $(S_1, S_2, \ldots, S_n)$ bounded by local maxima corresponding to $c_w$ and of length equal to the number of colors per frame (r), plus the framing delimiters $(c_w, c_b)$;
   m. calibrating and transforming all values within each frame $S_i$, use the local maxima's and minima's r, g, b values corresponding to the transmitted $(c_w, c_b)$ values to yielding the original transmitted sequence E;
   n. restoring the original $M_i$ subsequences of M by applying $f^{-1}$ to each element of E: $(f^{-1}(e_1), f^{-1}(e_2) \ldots, f^{-1}(e_j))= (f^{-1}(f(M_1)), f^{-1}(f(M_2)), \ldots, f^{-1}(f(M_j))=(M_1, M_2, \ldots, M_j)$; and
   o. concatenating each $M_i$ to obtain M: $M=M_1 M_2 \ldots M_j$.

5. A method of encoding, transmitting and decoding data by a processor according to claim 4 wherein an optional step after step m. includes restoring duplicate symbols by replacing each $e_i=c_r$ in E with its predecessor $e_i-1$.

6. A method of encoding, transmitting and decoding data by a processor according to claim 1 wherein said defining step includes representing a binary number that corresponds to said predetermined color combination of red, green and blue channels.

7. A method of encoding, transmitting and decoding data by a processor according to claim 1 wherein said defining step includes representing character data that corresponds to said predetermined color combination of red, green and blue channels.

8. A method of encoding, transmitting and decoding data by a processor according to claim 1 wherein said transmitting step is performed at a bit rate in the range of approximately 30 to 300 bits per second.

9. A method of encoding, transmitting and decoding data by a processor according to claim 1 wherein said transmitting step of said encoded data is performed by a transmitter selected from the group consisting essentially of a computer screen, a television and a projection system.

10. A method of encoding, transmitting and decoding data by a processor according to claim 1 wherein said decoding step is performed by a decoder selected from the group consisting essentially of an RGB color sensor, a cell phone with video capability and a video capable smart device.

11. A method of encoding, transmitting and decoding data by a processor according to claim 1 wherein the arranging protocol step includes a calibration protocol providing a full-intensity combination of red, green and blue color channels at predetermined sequences during the transmission.

12. A two factor authentication method comprising the steps of:
   a. Entering a user name to a requester by a user wishing to be authenticated;
   b. Looking up a cryptographic key by requester, said key corresponding to a user's implementing device,
   c. encoding a challenge as changing colors that only the user's device can successfully decode;
   d. presenting the encoded challenge to the user as a sequence of flashing colors on a display screen;
   e. holding the implementing device up to the display screen by the user;
   f. decoding the challenge by the implementing device;
   g. decrypting the challenge by the implementing device;
   h. submitting the password and successfully decoded and decrypted challenge by the user to the requester;
   i. determining whether or not the challenge corresponds to the encoded challenge by the requester and therefore whether or not the identity and validity of the user corresponds to a stored record.

13. A two factor authentication method according to claim 12 wherein said encoding step comprises encoding a challenge phrase as changing colors that only the user's implementing device can successfully decode.

14. A two factor authentication method according to claim 12 wherein said encoding step comprises encoding a challenge that includes a set of characters as changing colors that only the user's implementing device can successfully decode.

15. A two factor authentication system comprising:
   a. a transmitter configured to display a plurality of bit patterns as a sequence of flashing colors in a predetermined color combination of red, green and blue channels;
   b. an implementing device having a microprocessor and a display; and
   c. said microprocessor configured to decode and decrypt said plurality of bit patterns displayed by said transmitter into a challenge; whereby said challenge is displayed on said display of said implementing device, to provide a security system that allows a user to respond to said transmitter with a decoded and decrypted challenge to pass a two factor authentication test.

\* \* \* \* \*